United States Patent [19]
Woodworth

[11] Patent Number: 5,570,006
[45] Date of Patent: *Oct. 29, 1996

[54] A.C. STORAGE MODULE FOR REDUCING HARMONIC DISTORTION IN AN A.C. WAVEFORM

[75] Inventor: George K. Woodworth, Gainesville, Va.

[73] Assignee: Power Distribution, Inc., Sandston, Va.

[*] Notice: the term of this patent shall not extend beyond the expiration date of Pat. No. 5,323,304.

[21] Appl. No.: 261,329

[22] Filed: Jun. 16, 1994

Related U.S. Application Data

[63] Continuation-in-part of Ser. No. 89,226, Jul. 8, 1993, Pat. No. 5,323,304, which is a continuation of Ser. No. 826,958, Jan. 27, 1992, abandoned.

[51] Int. Cl.$^6$ ................................. G05F 1/70
[52] U.S. Cl. ................. 323/208; 327/551; 333/12
[58] Field of Search ................. 327/551, 557, 327/558, 559; 323/208; 361/113; 333/12

[56] References Cited

U.S. PATENT DOCUMENTS

| | | | |
|---|---|---|---|
| 2,333,211 | 7/1942 | Stevens | 171/119 |
| 2,743,412 | 4/1956 | McLean | 322/96 |
| 3,219,917 | 8/1962 | Dome | 323/76 |
| 3,237,089 | 2/1966 | Dubin et al. | 323/44 |
| 3,289,064 | 11/1966 | Doyle et al. | 320/1 |
| 3,333,203 | 7/1967 | Baker | 328/59 |
| 3,683,269 | 8/1972 | Wanlass | 323/44 |
| 3,683,271 | 8/1972 | Kobayashi | 323/76 |
| 3,881,137 | 4/1975 | Thanawala | 317/53 |
| 3,955,134 | 5/1976 | Woodford | 323/61 |
| 4,259,705 | 3/1981 | Stifter | 361/56 |
| 4,558,391 | 12/1985 | Ward et al. | 361/155 |
| 4,630,163 | 12/1986 | Cooper et al. | 361/56 |
| 4,724,333 | 2/1988 | Hedin | 307/105 |
| 4,725,739 | 2/1988 | McCartney et al. | 307/35 |
| 4,808,843 | 2/1989 | Hedin | 307/105 |
| 4,831,487 | 5/1989 | Ruoss | 361/111 |
| 4,939,486 | 7/1990 | Bergdahl et al. | 333/175 |
| 5,005,100 | 4/1991 | Owen | 361/35 |

OTHER PUBLICATIONS

Introductory Circuit Analysis, Seventh edition 1994 (1st Edition 1968) pp. 837–841, Boylestad.

*Primary Examiner*—Peter S. Wong
*Assistant Examiner*—Shawn Riley
*Attorney, Agent, or Firm*—Bacon & Thomas

[57] ABSTRACT

A circuit for correcting perturbations in a power system signal operating at a system line frequency includes a capacitor for drawing a capacitive current and a first inductor for drawing an inductive current substantially equal in amplitude and substantially one hundred eighty degrees out of phase with the capacitive current. The first inductor is connected in parallel with the capacitor to form a storage module for storing energy therein wherein the storage module is tuned to resonate at the system line frequency and wherein the storage module is connected in parallel across the load. A second inductor connected in series between a power source and the load isolates the power source from the load while a second capacitor in series with the second inductor, which together are tuned to resonate at the system line frequency, prevents voltage drop across the second inductor with linear loads.

2 Claims, 11 Drawing Sheets

50 Volts Per Division (Vertical)

5 Milliseconds Per Division (Horizontal)

CLEAN UTILITY POWER LINE SINEWAVE

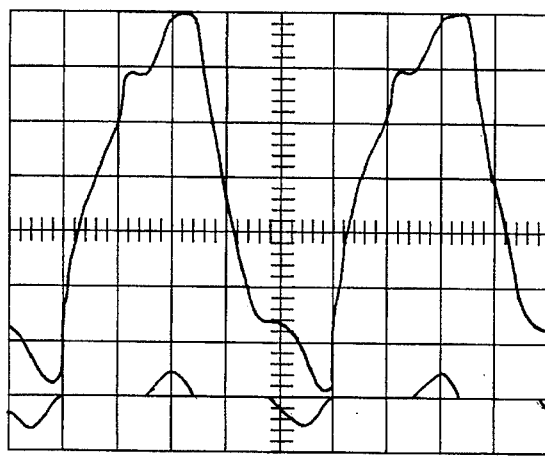
SINEWAVE WITH HARMONIC DISTORTION    FIG. 3
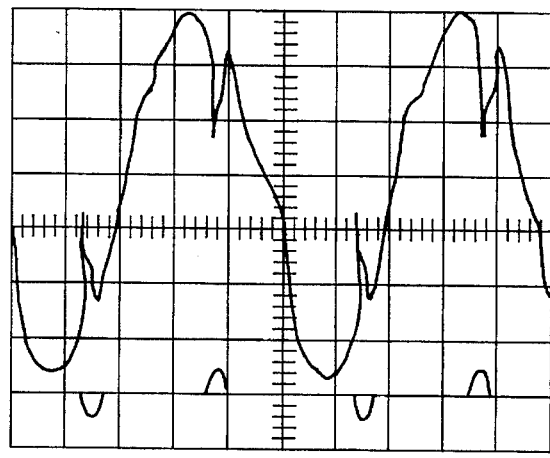
DISTORTION OF THE SINEWAVE
DUE IMPULSE LOADING    FIG. 4
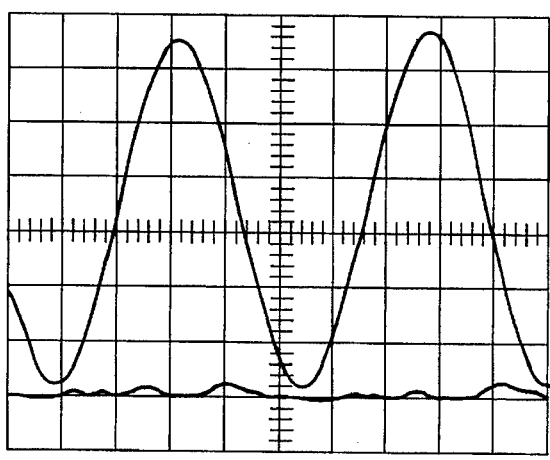
WAVEFORM DISTORTION CORRECTION
BY THE ACSM    FIG. 5

A.C. STORAGE MODULE FOR REDUCING HARMONIC DISTORTION IN AN A.C. WAVEFORM

This is a continuation-in-part application of U.S. patent application Ser. No. 08/089,226 filed Jul. 8, 1993, now U.S. Pat. No. 5,323,304, which is a continuation of U.S. patent application Ser. No. 07/826,958 filed Jan. 27, 1992, now abandoned.

FIELD OF THE INVENTION

The present invention is directed generally to a parallel resonant circuit for storing energy and more particularly, to a parallel resonant circuit for storing alternating current energy for reducing harmonic distortion in an alternating current waveform.

DESCRIPTION OF THE BACKGROUND OF THE INVENTION

There is an increasing population of electrical and electronic equipment utilizing alternating current line rectifiers, especially office computers, motor speed controllers and other equipment which draw nonlinear currents. A concern in the power engineering industry focuses on the disruptive harmonic effects of voltage transients and spikes caused by those electronic or nonlinear loads. Many times, the equipment which is causing those harmonics is, at the same time, sensitive to those harmonics that similar devices are creating. In addition to the harmonics damaging the device producing them, those harmonics may also adversely affect other pieces of electrical equipment connected to the power line and may even damage the power generation and distribution system itself.

Nonlinear loads may affect two types of power systems: single-phase, most common in office settings, and three-phase, most common in industrial applications. Harmonic induced problems frequently manifest themselves in improper operation, malfunction, shutdown of the equipment, or premature equipment failures. In three-phase, four wire systems, some harmonic currents, for example, the third harmonic, do not null at the neutral conductor, but rather sum, which may cause over-loading of that neutral conductor. The inherent danger in such overloading is the risk of damage or fire, as there is no circuit breaker on the neutral to limit the current flow.

Known techniques to improve the quality of the power system voltage waveforms are largely ineffective in correcting that problem. One common way to address the harmonics problem is to attempt to restrict harmonic currents by use of passive filters or harmonic traps. Those filters are tuned to a specific frequency, normally the highest amplitude harmonic. Filters operate by "notching out" portions of the disturbance. Such filters may absorb some of the harmonic energy, however, the dissipated energy is wasted as nonproductive heat loss. Further, such absorption is limited to a specific frequency and thus, voltage spikes or dips which occur at frequencies other than the specific frequency of the filter are not corrected nor are they correctable without the addition of an additional filter.

Generic "line clipping devices" do not restore minor voltage dips or harmonic distortion and can not clamp or reduce any electrical disturbances that occur below the peak amplitude of the sine wave. With respect to three-phase systems, to upgrade the present electrical distribution system to reduce the effective power source impedance by substituting larger neutral and phase conductors is both costly and often an impractical solution.

Applicant's copending U.S. patent application Ser. No. 08/089,226, filed Jul. 8, 1993, (the "226 application"), which is hereby incorporated by reference, addresses those problems caused by non-linear loads. The invention claimed in the '226 application substantially reduces or eliminates the harmonic effects which nonlinear loads and switched power loads may create on a power distribution system, thereby permitting the distribution system to provide clean, quality power to other sensitive equipment. That invention provides a local, low impedance alternating current source of quality power to satisfy the requirements of sensitive load equipment which may be connected to its output.

The invention as described in the '226 application is effective in making non-linear load currents appear linear to the power source. However, drawing continuous current through a device constructed according to the teachings of the '226 application may cause a voltage droop and slight phase shift across the series inductor used to isolate the power source from the storage module. While non-linear loads are tolerant of those effects, linear loads may not be as tolerant and may fail to operate properly if subjected to such undervoltage conditions. In applications comprising multiple loads, for example, in an office or laboratory environment, the load on a power system is typically comprised of a mixture of both linear and non-linear devices. Thus, at least a portion of the equipment is drawing linear current and is subject to such undervoltage conditions.

Accordingly, a further improvement is needed beyond that of the '226 application such that linear loads connected to such power systems continue to operate effectively.

It is an object of the present invention to substantially reduce or eliminate the harmonic effects which non-linear loads and switched power loads may create on a power distribution system similar to the effects of the invention described in the '226 application without affecting the operation of either linear or non-linear loads. It is a feature of the present invention to provide stored energy in a parallel resonant circuit to smooth the effects which Nth-order harmonics and voltage spikes or dips may have on that power distribution system. It is a further feature of the present invention to provide an in-line inductance to further isolate the power source from the effects of non-linear loading. It is yet another feature of the present invention to provide an in-line capacitance to prevent voltage droop or phase shifting of the power signal. It is an advantage of the present invention that when harmonics and/or transient voltage disturbances do occur on the power line, the effects of such disturbances will not impact the equipment attached thereto as the power line waveform will be instantaneously smoothed while maintaining acceptable voltage levels. A further advantage of the present invention is that a device embodying the present invention may be advantageously applied to any type of sinusoidal, fixed frequency, alternating current power system.

SUMMARY OF THE INVENTION

The present invention is directed to an alternating current storage module for correcting voltage and current distortions in a power system operating at a system line frequency wherein the storage module is connected in parallel with a load's impedance. The storage module includes a capacitor for drawing a capacitive current and a first inductor for drawing an inductive current equal in amplitude and one hundred eighty degrees out of phase with the capacitive current. The first inductor is connected in parallel with the capacitor to form a storage module for storing energy. The storage module is tuned to resonate at the system line frequency such that the parallel resonant reactance of the storage module is at its peak at the system line frequency and lower at frequencies above and below the system line frequency. As such, the storage module absorbs voltage perturbations in excess of the amplitude of the power system signal at all frequencies above or below the system line frequency and provides energy to restore notches in the amplitude of the power system signal at all frequencies above or below the system line frequency. According to a preferred embodiment of the invention, a second inductor is connected in series between a power source and the load impedance for isolating the power source from that load impedance and a second capacitor is connected in series with the second inductor to minimize the effect of an inductive voltage drop across the second inductor and wherein the second inductor and second capacitor are series tuned to the system line frequency. A winding may be attached to the first inductor to provide an additional output voltage boost.

The present invention is also directed to a method for correcting voltage and current distortions in a power system operating at a system line frequency comprising the steps of forming a storage module wherein the storage module comprises a capacitor for drawing a capacitive current and a first inductor for drawing an inductive current equal in amplitude and one hundred eighty degrees out of phase with the capacitive current connected in parallel with the capacitor and wherein the storage module is tuned to resonate at the system line frequency. The method further comprises the steps of connecting the parallel resonant circuit in parallel with a load and may further include the step of inserting a second inductor and a second capacitor connected in series with each other and between an alternating current power source and the load wherein the second inductor and second capacitor are tuned to the system line frequency.

Accordingly, the addition of a device constructed according to the present invention greatly diminishes the effective power line impedance as seen by the load at frequencies above and below the system's power line frequency and thereby limits any local distortion. Moreover, the voltage droop and phase shifting of the signal which may have otherwise been caused by the line inductor are minimized or eliminated. The impedance at the output terminals of the device is very low and may source current at frequencies both above and below that of the power line. The parallel impedances of the power line and the device(s) connected to it provide an impedance far less than either impedance alone. This lower source impedance offers the load a stiffer power source which does not sag or drop out during high loading conditions due to load turn-on/turn-off impulses.

BRIEF DESCRIPTION OF THE DRAWINGS

The various objects, advantages and novel features of the present invention will now be described, by way of example only, in the following detailed description when read in conjunction with the appended drawings, in which:

FIG. 3 is a representation of a power line voltage waveform exhibiting distortion due to the presence of non-linear loads;

FIG. 4 is a representation of a power line voltage waveform illustrating distortion due to impulse loading effects;

FIG. 5 illustrates the waveform of FIG. 5 as corrected by the alternating current storage module of the present invention;

FIG. 15i bshows a graph of total harmonic distortion at the output voltage shown in FIG. 15a;

FIG. 16a shows a graph of the source line current of the non-linear load after correction by the storage module constructed according to FIG. 8 and whose output voltage is shown in FIG. 15a; and FIG. 16b shows a graph of total harmonic distortion of the source line current show in FIG. 16a.

DETAILED DESCRIPTION OF THE PREFERRED EMBODIMENT

Figure 1:
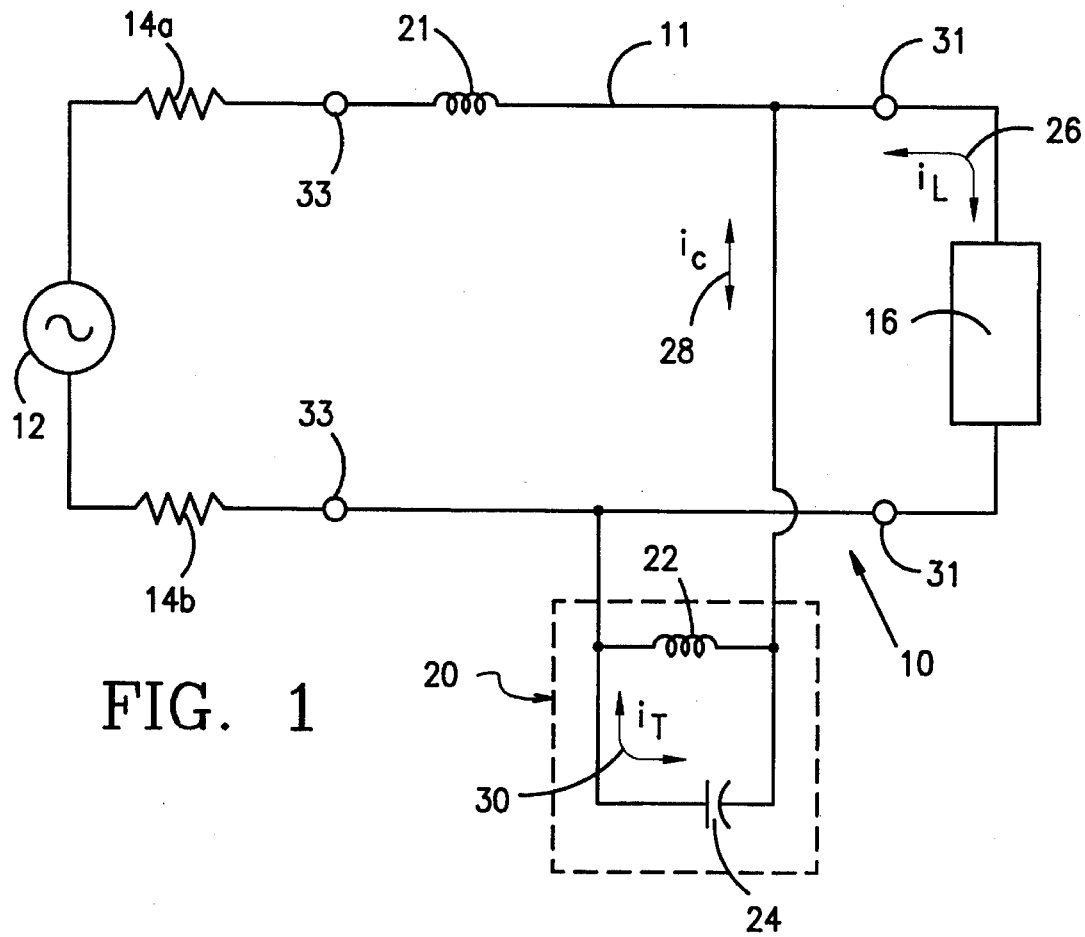
FIG. 1 is a schematic diagram illustrating the manner in which a circuit constructed according to the present invention may be connected to an A.C. power distribution system.
Figure 2:
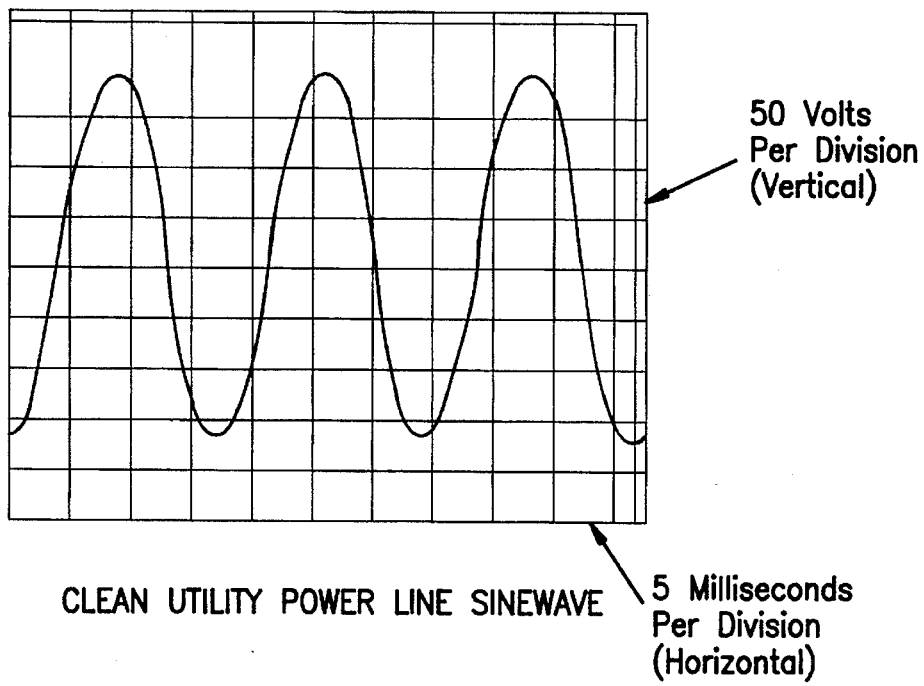
FIG. 2 is a representation of a clean utility power signal.

With reference to FIG. 1, there is shown a schematic of an electrical circuit 10 embodying the alternating current storage module 20 of the present invention. Like reference numerals will be employed among the various figures to denote like elements. As shown in FIG. 1, the electrical circuit 10 includes an alternating current power source 12, power distribution system impedances 14a, 14b along the power line 11, and the alternating current storage module, represented by the dashed line box 20. The alternating current storage module 20 comprises an inductor 22 and capacitor 24 connected in parallel forming a parallel resonant circuit. An inductor 21 is connected in series between the power source 12 and the load 16 along the power line 11. The power line 11 provides a power signal to the load 16 which is ideally in the form as shown in FIG. 2.

The primary internal energy storage components of the storage module 20, the capacitor 24 and the inductor 22, are tuned to a parallel resonant frequency that matches the power line frequency which may, for example, be 60 Hz. The reactive impedances of the components in the storage module 20 are substantially equal in value and opposite in sign resulting in a current that circulates between the inductor 22 and capacitor 24 twice per sine wave. That current, $i_r$ is represented by numeral 30 in FIG. 1. The circulating current 30 continues to ring back and forth until it is utilized or dissipated in losses within the capacitor 24 and inductor 22. The storage module 20 is sized such that the circulating current 30 is on the order of the load current 26. When the storage module 20 is connected to the power line 11, the line voltage provides a small amount of correction current, $i_c$, shown as 28 in FIG. 1, to replace the cycle to cycle losses within the storage module 20. In a steady-state condition without a load on the output terminals 31, the correction current 28 feeding the storage module 20 is at a minimum value and the energy stored in the storage module 20 is at its maximum value.

All of the energy stored within the storage module 20 is available at the instant a load 16 is placed across the output terminals 31. If the line voltage across the storage module 20 suddenly deviates in amplitude by only a few volts, whether because of source voltage distortion present at the input terminals 33, or because of distortion current drawn by the load from the output terminals 31, a heavy correction current 28 will flow as the storage module 20 moderates this change. As will be understood by those skilled in the art, the polarity of that correction current 28 will be of the proper sign necessary to reduce the voltage rate of change across the storage module 20. In that manner the line voltage is integrated by the storage module 20 which reduces the amount of distortion and size of voltage deviations present on the output terminals 31. The integral of noise and harmonic voltage deviations is normally a zero value. Any transient energy delivered to or absorbed by the load 16 at one point in the waveform is typically offset by an equivalent and opposite noise energy component elsewhere on the sine wave.

FIG. 3 illustrates a sine wave with harmonic distortion. FIG. 4 illustrates a sine wave with distortion due to impulse loading. Impulse line voltage disturbances due to the turn-on and turn-off cycles of a load 16 or lightning-type discharges may cause fast rising spike waveform distortion. The integration effect of the storage module 20 reduces the amplitude of those impulses and spreads or redistributes the disturbance over time. The process of compressing spike impulses by spreading the noise energy in time reduces the peak amplitude of the noise energy. FIG. 5 illustrates a result of that spike suppression capability. That spike suppression capability is effective at all points of the power line voltage waveform and is especially effective at the zero voltage waveform crossover regions.

The storage module 20 may be advantageously connected to the power receptacle feeding nonlinear loads to correct harmonic distortion and impulse loading problems. High amplitude impulse load current pulses are now supplied by the combination of the storage module 20 and the power line 11. Currents in the hundreds of amperes are readily provided by the storage module's 20 capacitor 24 to replenish gaps caused by the load's 16 sudden demands. The energy needed to replenish the storage module 20 is provided gradually by the power line 11 reducing any effects of distortion on the voltage waveform. The smoothing flywheel effect of the storage module 20 circuit helps average out loading fluctuations as seen by the power source 12.

As described in more detail below, the storage module 20 is designed to assist the prime power source 12 to handle non-linear loads. Internally the components of the storage module 20 are sized to store sufficient energy to withstand any anticipated load impulses.

The capacitor 24 of the storage module 20 provides the integration function that corrects the voltage deviations present on the power line 11. Because the capacitor 24 value used is typically large, the capacitor 24 has a very low internal resistance which presents a small capacitive impedance at the power line frequency. This reactive impedance value falls to lower values at the higher order harmonic frequencies.

Noise impulses that have sharp high frequency characteristics are composed of harmonic frequencies that may extend up into the megahertz frequency range where the reactance of the capacitor 24 is on the order of milliohms. As the apparent impedance of the capacitor 24 declines, the current required to change the voltage impressed across the capacitor 24 grows rapidly. Testing has shown that a storage module 20 capable of storing a single Joule of energy connected to a power line 11 will absorb or supply hundreds of amperes of current needed to suppress noise spikes of 100 volts or less.

The inductor 22 in the storage module 20 is used to draw an inductive current that offsets or nulls the circulating capacitive current. If a capacitor 24 of the same size used in the storage module 20 were connected to the power line 11 without an inductor 22, that capacitor 24 would provide an equal noise correction effect. Nonetheless, the inductor 22 serves two functions. First, the inductor 22 minimizes the line current 28 circulating between the power source 12 and the capacitor 24. Second, the inductor 22 prevents the capacitor 24 from resonating or otherwise disturbing the load 16 or other system components.

The inductive current is preferably one hundred eighty (180) degrees out of phase with the capacitive current to balance and thereby neutralize the effect of the capacitive current. That resonant condition of the inductor and capacitor provides a very high impedance to the power source 12 at the system line frequency and therefore draws a minimum line correction current 28 during steady-state operation. That correction current 28 is only make-up energy for the storage module 20 and is resistive in nature at the resonant frequency of inductor 22 and capacitor 24. The inductor 22 and capacitor 24 at resonance are electrically balanced and therefore do not react with other circuit elements connected to the power line.

The storage of about one Joule of energy for use on a typical North American power distribution system of 115 VAC RMS requires a capacitor of about 90 microfarads. The impedance of this capacitor is predicted by the formula:

$$X_c = \frac{1}{2\pi f C}$$

wherein
$X_c$=capacitive reactance
f=operating frequency
C=capacitance

As can be seen, that formula takes into consideration the operating frequency. As an example, at a power line frequency of 60 Hertz, a 90 microfarad capacitor has a capacitive reactance of 29.4 ohms. At higher frequencies the impedance value continues to decline and at a frequency of 10,000 Hertz, that impedance would be only 170 milliohms.

The amount of energy stored in the storage module 20 can be calculated by determining the peak voltage available from the power source 12 and selecting the electrical size of the capacitor 24. That voltage value and the capacitor's size determine the amount of charge stored as defined by the formula:

$$E_j = \tfrac{1}{2} C\, E^2$$

wherein:
 $E_j$=energy stored (Joules)
 C=capacitance
 E=peak voltage

As can be seen, stored energy increases linearly as the capacitor size is increased and is a squared function of the change in voltage.

The size of the inductor 22 needed to resonate with the capacitor 24 can be calculated by using the formula:

$$L = \frac{\left[\frac{1}{(2\pi f)}\right]^2}{C}$$

wherein:
 L=inductance (Henrys)
 f=operating frequency
 C=capacitance (Farads)

The inductor 22 value is affected by the operating frequency of the power source 12 and decreases in size as the operating line frequency is increased.

The circulating current present in the storage module 20 is described by the following formula:

$$I_T = \frac{E_{line}}{X_L} = \frac{E_{line}}{X_c}$$

Wherein:
 $I_T$=Storage module current (RMS Amps)
 $En_{LINE}$=Power Source Voltage (RMS)
 $X_L$=Inductive Reactance
 $X_c$=Capacitive Reactance That information is necessary to determine the ratings of the L and C components. Capacitors are preferably selected to withstand the anticipated operating line voltage and the calculated circulating or ripple current. The amount of capacitor current in any capacitor can be proportionally scaled to accommodate a variety of capacitor technologies desired. Alternatively, multiple smaller value capacitors may be connected in parallel to provide the total capacitance value required. Such division of the capacitive requirements allows the heating effects caused by the current to be distributed to numerous physical capacitors to facilitate component cooling.

The amount of current circulating within the storage module 20 is identical for both the capacitor 24 and inductor 22. The inductor 22 must be designed with wiring sized to carry the current 30 without excessive losses that would cause internal heating. The core of the inductor 22 must also be sufficient in cross-section to prevent magnetic saturation which would cause poor circuit operation and possibly add distortion to the power line 11. The internal wiring of the storage module 20 preferably provides low impedance to allow the very high and rapidly rising noise correction currents to pass in an unimpeded manner to the power distribution system.

As shown in FIG. 1, an inductor 21 may be advantageously positioned in series with the power source 12 and the load 16. The series inductor 21 isolates the power source 12 from the load such that harmonic currents which may be generated by the load will minimally affect the power source 12. Further, the series inductor 21 serves to increase the effective impedance of the power source 12 as seen by the load 16, which in turn causes the load 16 to primarily draw additional peak load current 26 from the storage module 20 instead of the power source 12, thus reducing harmonic currents supplied by the power source 12 even further.

By way of example, in a 120 VAC, 15 ampere circuit, a series inductor 21 may have a value of approximately 8 to 15 millihenries, the capacitor 24 may have a value of approximately 400 microfarads and inductor 22 may have a value of approximately 18 millihenries.

In linear loading conditions, the reactive voltage drop across the series inductor 21 may cause a measurable voltage loss at the output. To calculate the output voltage based on the loss incurred across the inductor, applying vector analysis, the resulting output voltage would be:

$$\bar{V}_{in}^2 - \bar{V}_L^2 = \bar{V}_o^2$$

where
 $V_o$ is the resulting output voltage;
 $V_{in}$ is the input voltage; and
 $V_L$ is the voltage drop at 90° phase with respect to the source.

Note that the effect of the storage module 20 can be ignored in steady state conditions.

By way of example only, if the power source 12 is supplying 100 Vac and the series inductor 21 voltage drop is 50 volts at a 90° phase with respect to the power source 12 voltage, the resulting output voltage would be 86.6 volts, or 86.6% of the input voltage. At inductive phase angles less than 45°, the inductive effect on the output voltage is less severe.

To minimize the effect of that inductive voltage drop, it is necessary to reduce or eliminate the inductive voltage drop. Traditional methods for doing so, such as reducing the frequency, reducing the output current, or reducing the inductance value, would create undesirable circuit effects.

Figure 8:
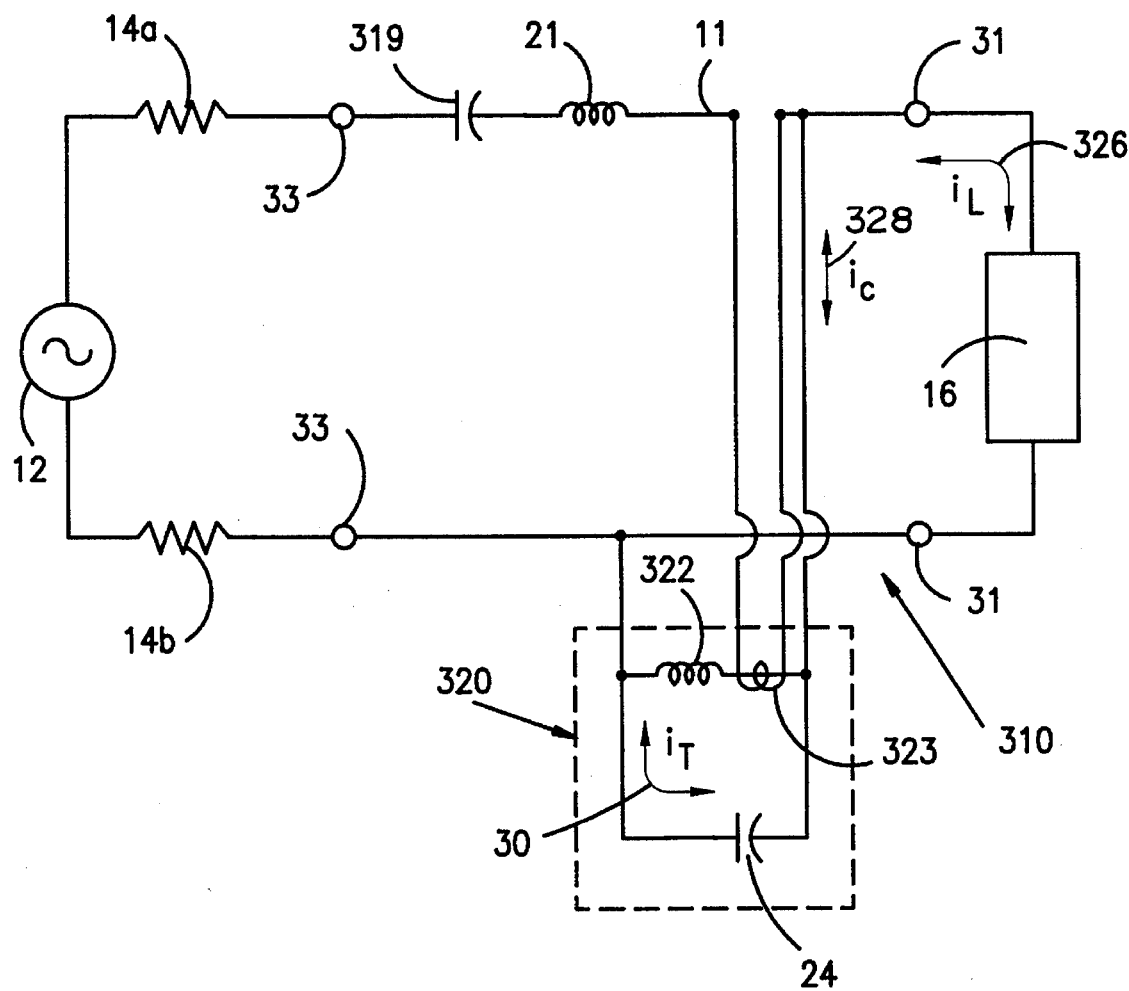
FIG. 8 is a schematic diagram of the circuit of FIG. 1 further comprising a line capacitor and additional winding to boost the output voltage.

As shown by the circuit 310 in FIG. 8, the problem of voltage drop can be overcome with the addition of a series capacitor 319. This is because the capacitive reactance of the series capacitor 319 subtracts directly from the inductive capacitance of the series inductor 21. The size of the series capacitor 319 should be such that the capacitive reactance is equal to the inductive reactance of the series inductor 21 thereby nulling out the sum of both reactances. By tuning the series capacitor 319 and the series inductor 21 to resonate at the system line frequency, the total impedance of the combination of the series capacitor 319 and series inductor 21 is at a minimum at the system line frequency. The addition of the series capacitor 319 in that manner boosts the load current 326 available to the load 16. The storage module 320 would thus supply correction current 328 to correct distortion in that load current 326.

In choosing L and C values for the series inductor 21 and the series capacitor 319, any combination of C and L values which resonate at 60 Hz would suffice. It is preferred that the C to L ratio be high so as to present the smallest resistance value to the load. That is because a larger capacitor has a lower effective series resistance, causing lower power losses and voltage drop characteristics. The use of a larger series capacitor 319 permits the use of a smaller series inductor 21 for resonance, further reducing system power losses.

Applying a similar vector analysis, the output voltage can now be calculated as:

$$\bar{V}_{in}^2 - \bar{V}_L^2 = \bar{V}_o^2$$

Where $V_L$ is the voltage loss after the capacitive impedance is vectorally added to the inductive impedance. Using the numbers from the previous example and assuming $V_L=5$ volts due to imperfect tuning, the output voltage becomes $V_o=99.87$ volts or 99.87% of the input voltage $V_{in}$. As can be seen, $V_o$ has been increased approximately 13.2 volts.

The arrangement of a series inductor 21 and a series capacitor 319 shown in FIG. 8 has two effects. First, the components form a narrow bandpass filter at the system line frequency, i.e., 60 Hz. Currents above the system line frequency are restricted due to the impedance of the series inductor 21 while those currents below the system line frequency are restricted due to the impedance of the series capacitor 319.

Second, the angle of the load current is unmodified by the series inductor 21 and series capacitor 319 as the sum of current phase shifts through the components null. Because input and output voltages are in phase, the voltages impressed across the storage module 320 are in phase with the source. This permits the addition of another feature to the storage module 320 and connected in series with series inductor 21. A small winding 323, for example, five (5) turns, generating only a few volts may be wound on the core of the inductor 322 of the storage module 320 and connected in series with series inductor 21. The winding 323 will develop an independent voltage which offsets or boosts the output voltage so as to compensate for any resistive losses in the series inductor 21 and the series capacitor 319. The resultant increased voltage increases the load current 326 accordingly. Thus, real world resistance losses may be compensated so as to provide output voltage to the load substantially equivalent to the input voltage. By adjusting the number of turns, the winding can raise the output voltage by reasonable amounts. The inductor 322 of the storage module 320 thereby serves the dual function of both an inductor and a transformer.

Figure 11:
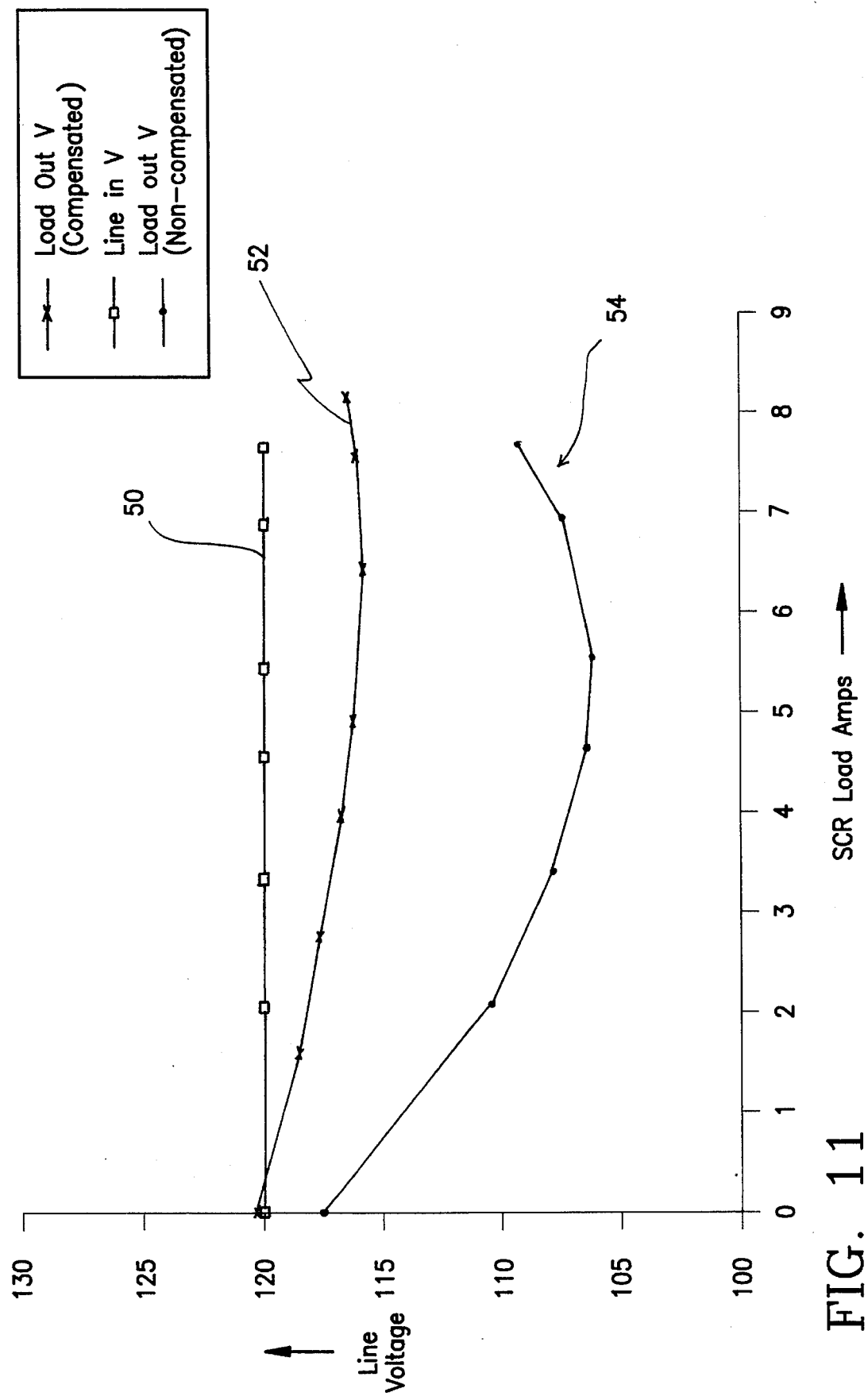
FIG. 11 shows a graph of a voltage output for a non-linear load comparing the effects of utilizing a storage module constructed according to FIGS. 1 and 8, respectively.

With reference to FIGS. 11 through 16b, there are shown in graphical format experimental results showing, inter alia, voltage output curves for various configurations of circuits embodying storage modules 20 or 320. FIG. 11 shows a line voltage wherein the voltage output 54 for a non-linear load using a storage module 20 in conjunction with a series inductor 21 and with no series capacitor and no additional windings is compared to the voltage output 52 using a storage module 320 with a series capacitor 319 and series inductor 321 added. Input line voltage is shown as 50.

Figure 12:
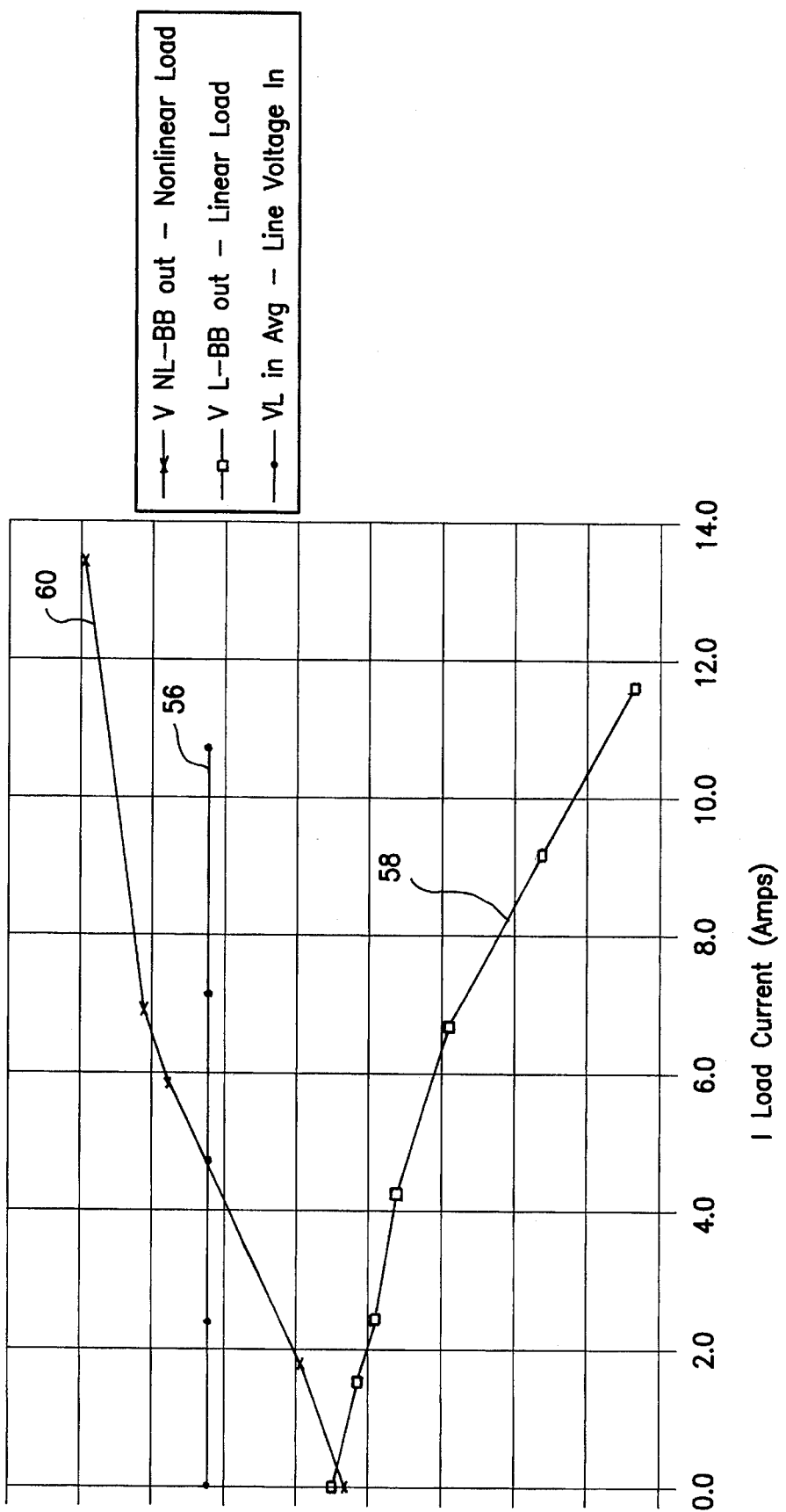
FIG. 12 shows a graph of a voltage response for a linear and non-linear load using a storage module constructed according to FIG. 1.

FIG. 12 shows the voltage output curves 58, 60 for both linear and non-linear loads, respectively, using a storage module 320 employing a series inductor 321 but no series capacitor. Average input line voltage is shown as 56.

Figure 13:
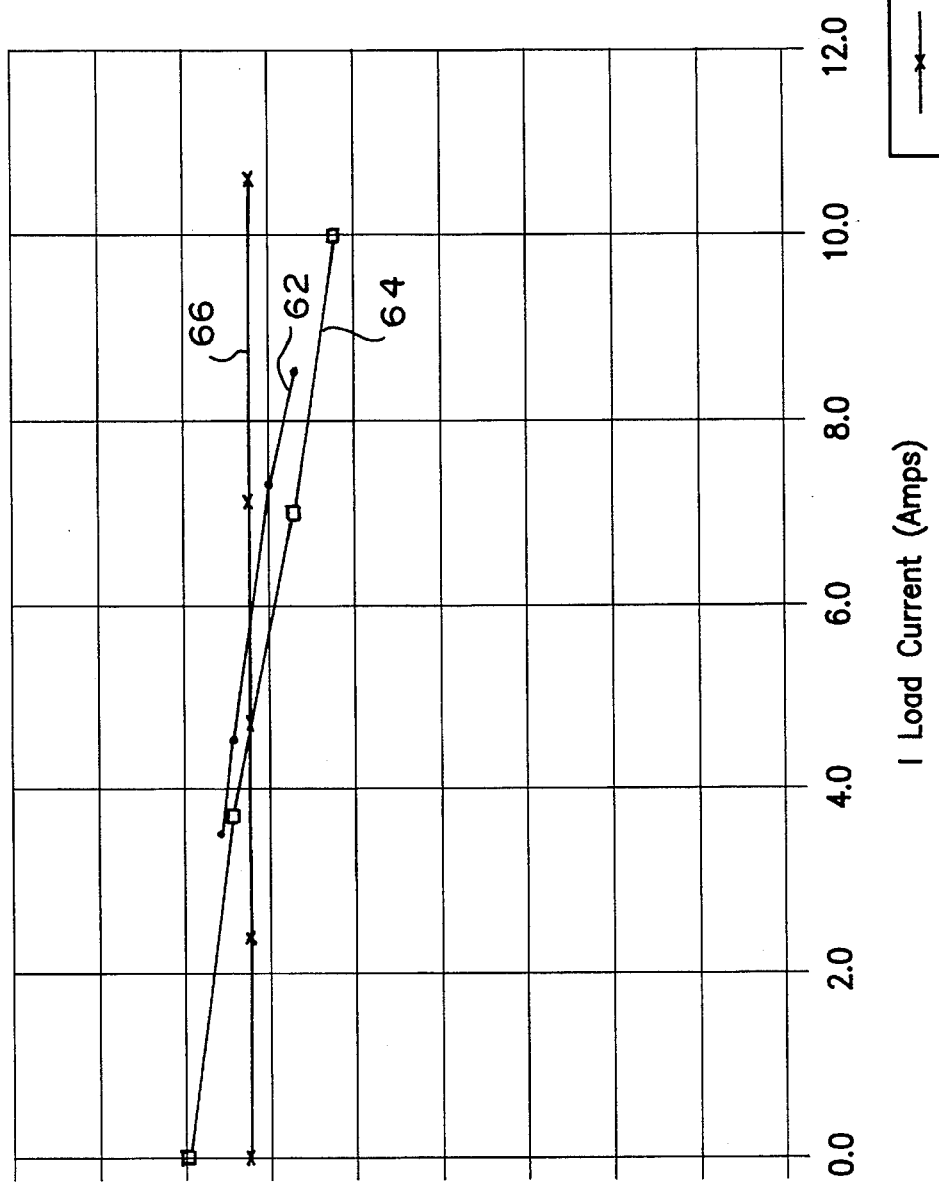
FIG. 13 shows a graph of a voltage response for both a linear and non-linear load using a storage module constructed according to FIG. 8.

FIG. 13 shows the voltage output curves 62, 64 for both a non-linear load and a linear load, respectively, using a storage module 20 with both a series inductor 21 and series capacitor 319 tuned to the system line frequency. Average input voltage is shown as 66.

Figure 14:
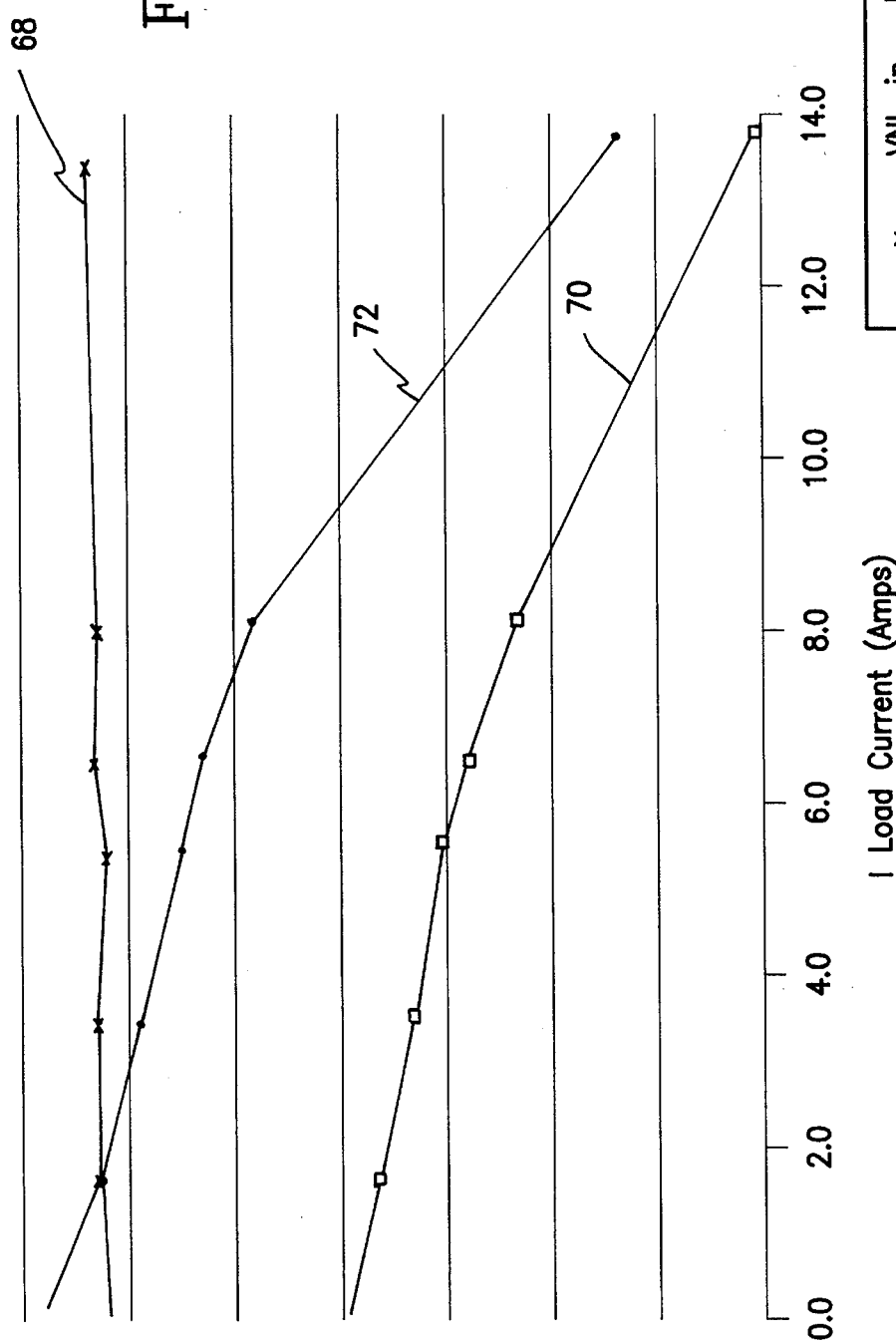
FIG. 14 shows a graph of a voltage response for a non-linear load using a storage module constructed according to FIG. 1 both with and without an additional five (5) turn boost coil added.

The effect of a winding 323 is illustrated in FIG. 14. Voltage curve 70 is the output voltage for a non-linear load without the winding 323 while voltage curve 72 is the voltage for the same load with a winding 323 added. The average input voltage is shown as curve 68.

Figure 15A:
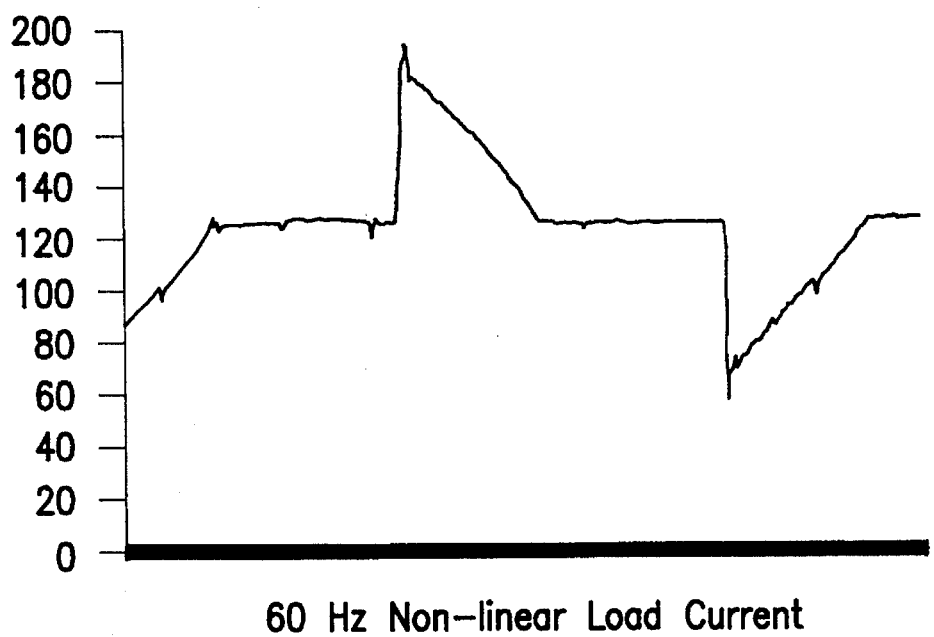
FIG. 15a shows a graph of the output voltage of a storage module constructed according to FIG. 8.

FIGS. 15a, 15b, 16a, 16b illustrate the effect that a storage module 320 may have on total harmonic distortion. FIG. 15a shows the voltage at the output of the storage module Measuring the harmonics yields the following results:

| Harmonic | Value |
|---|---|
| 1 | 100.00% |
| 2 | 2.50% |
| 3 | 62.30% |
| 4 | 5.10% |
| 5 | 23.50% |
| 6 | 6.7% |
| 7 | 20.60% |
| 8 | 5.10% |
| 9 | 16.10% |
| 10 | 5.30% |
| 11 | 12.00% |
| 12 | 4.60% |
| 13 | 11.10% |
| 14 | 4.50% |
| 15 | 7.60% |
| 16 | 4.60% |
| 17 | 7.00% |
| 18 | 4.80% |
| 19 | 5.80% |
| 20 | 5.50% |
| 21 | 5.80% |
| 22 | 4.70% |
| 23 | 4.70% |
| 24 | 4.50% |
| 25 | 3.70% |
| 26 | 4.40% |
| 27 | 3.40% |
| 28 | 4.50% |
| 29 | 2.60% |
| 30 | 4.50% |
| 31 | 2.50% |
| 32 | 4.10% |
| 33 | 2.00% |
| 34 | 4.10% |
| 35 | 1.60% |

Figure 15B:
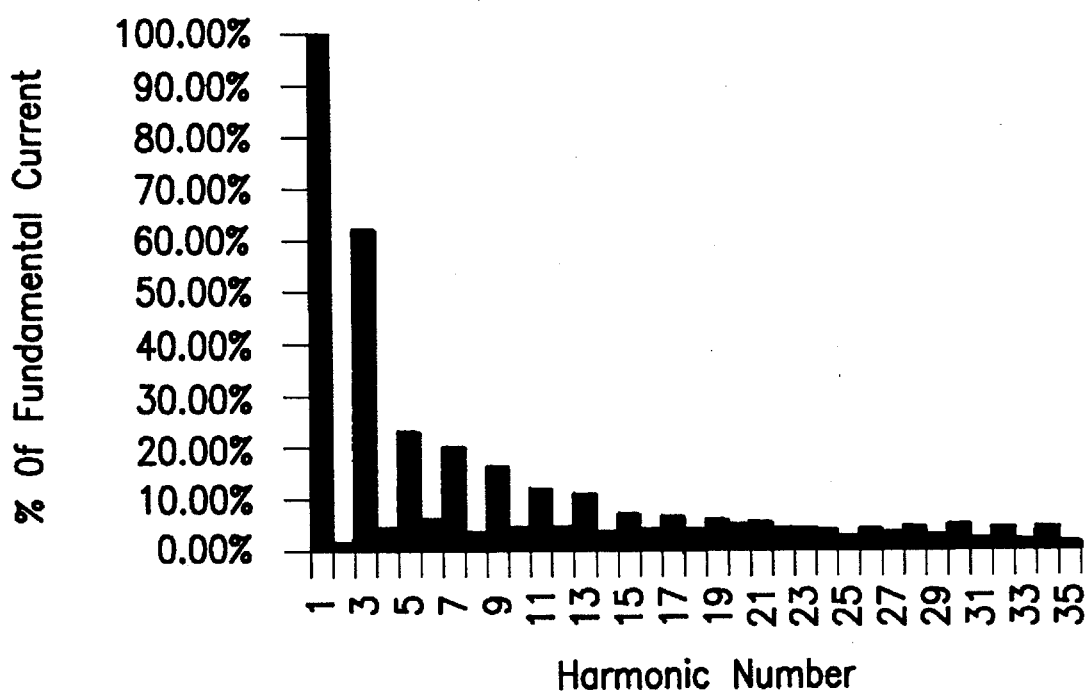
Figure 16A:
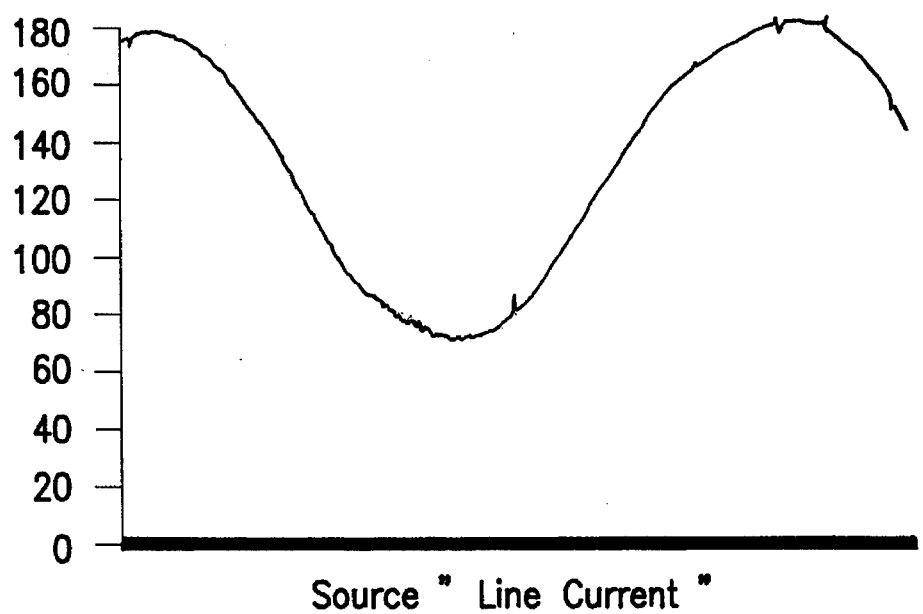
Figure 16B:
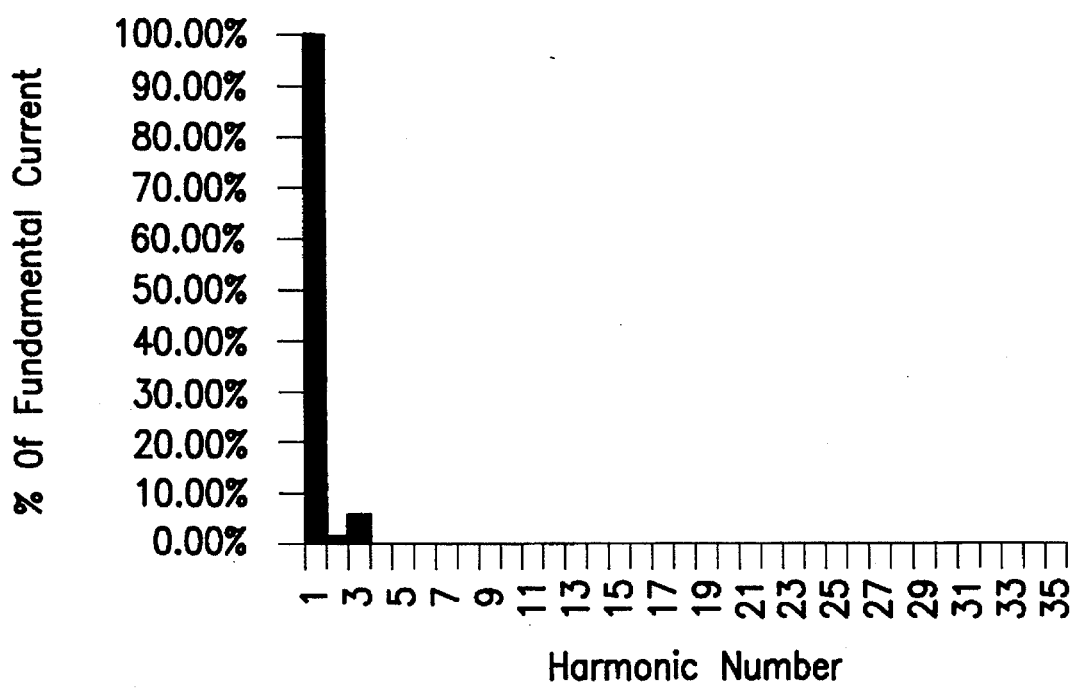

Those harmonics are shown graphically in FIG. 15b. The measured total harmonic distortion is 78.16%. FIG. 16a shows the corrected line current at the load, with the following harmonics shown graphically in FIG. 16b:

| Harmonic | Value |
|---|---|
| 1 | 100.00% |
| 2 | 2.20% |
| 3 | 5.60% |
| 4 | 0.40% |
| 5 | 0.60% |
| 6 | 0.40% |
| 7 | 0.20% |
| 8 | 0.20% |
| 9 | 0.20% |
| 10 | 0.10% |
| 11 | 0.20% |
| 12 | 0.10% |
| 13 | 0.10% |
| 14 | 0.20% |
| 15 | 0.20% |
| 16 | 0.20% |
| 17 | 0.10% |
| 18 | 0.20% |
| 19 | 0.00% |
| 20 | 0.10% |
| 21 | 0.20% |
| 22 | 0.10% |
| 23 | 0.10% |
| 24 | 0.10% |
| 25 | 0.10% |
| 26 | 0.10% |
| 27 | 0.00% |
| 28 | 0.10% |
| 29 | 0.00% |
| 30 | 0.00% |
| 31 | 0.10% |
| 32 | 0.00% |
| 33 | 0.00% |

| Harmonic | Value |
| --- | --- |
| 34 | 0.00% |
| 35 | 0.00% |

The measured total harmonic distortion is 6.16%.

Figure 6:
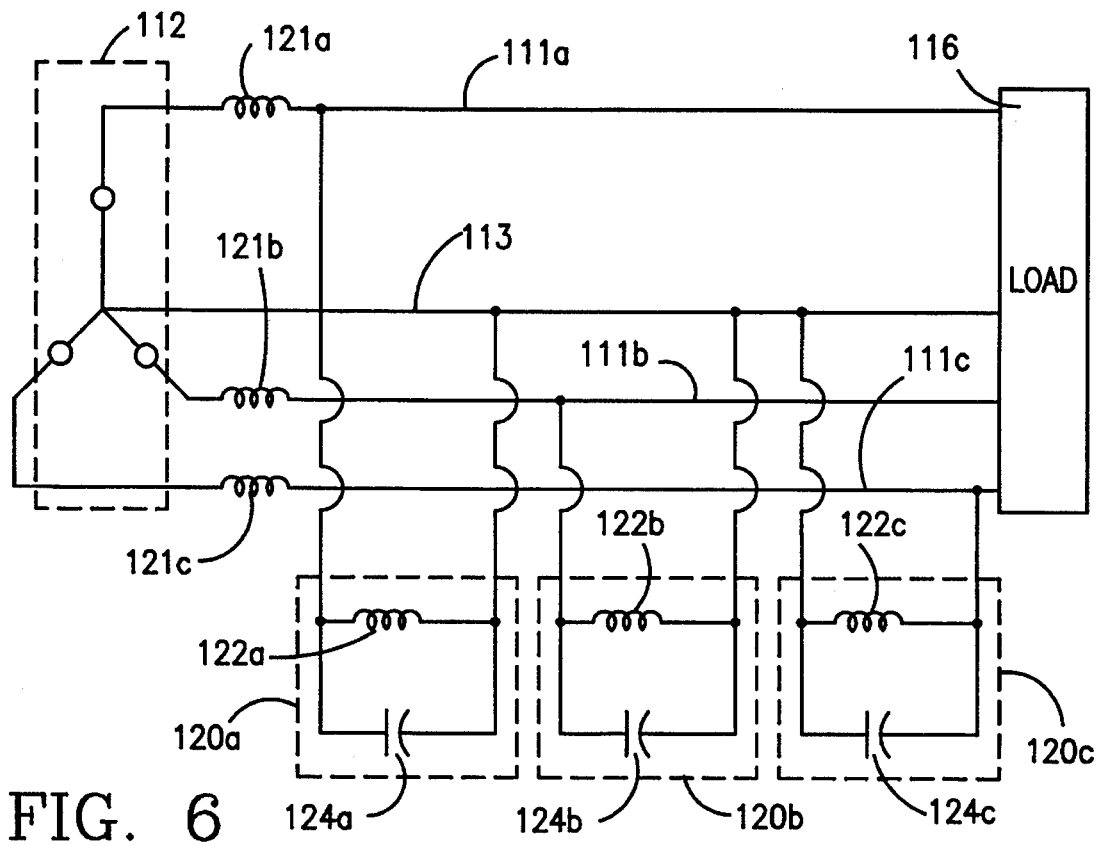
FIG. 6 is a schematic diagram of another embodiment of the alternating current storage module connected in a 3-phase wye-configuration power system.
Figure 9:
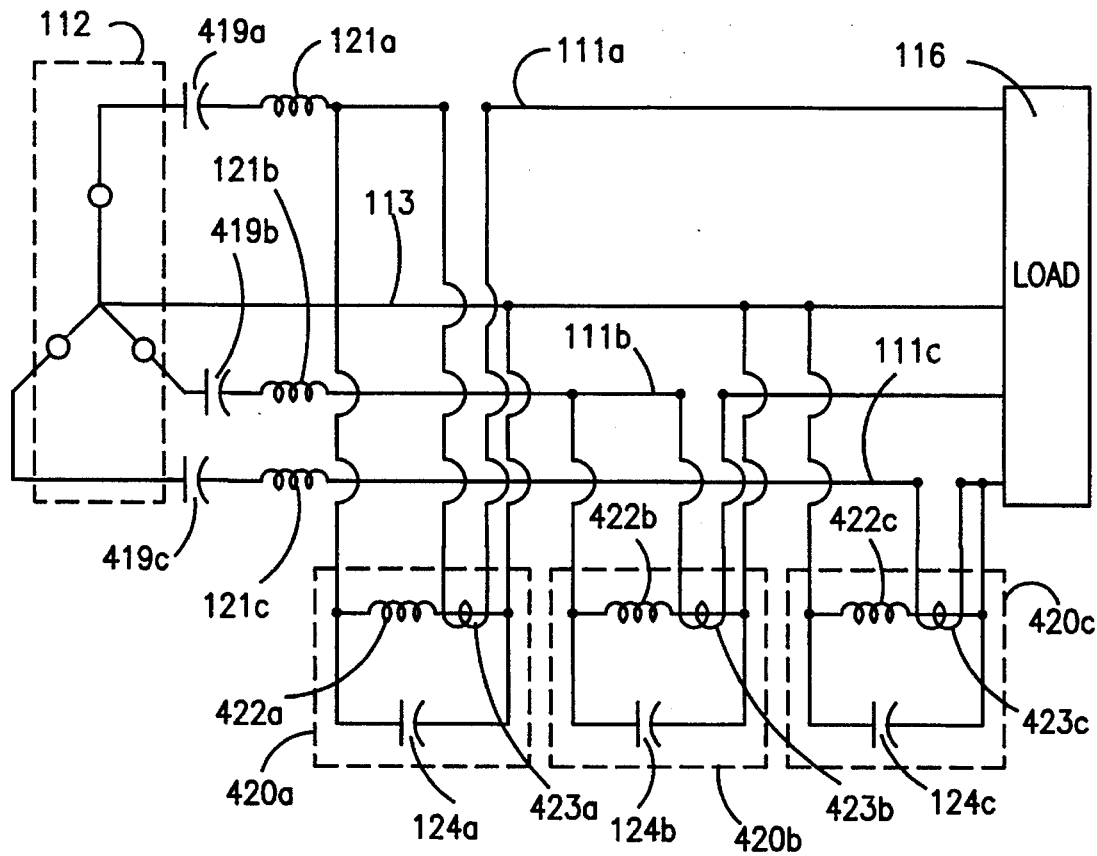
FIG. 9 is a schematic diagram of another embodiment of the circuit of FIG. 8 as adapted for a 3-phase wye-configuration power system.

The present invention may also be adapted for use in three-phase power systems. With reference to FIG. 6, there is shown a circuit comprising a three-phase power source 112 in a wye-configuration connected to a load 116. Three conductors 111a, 111b, 111c and a neutral conductor 113 provide a current path from the power source 112 to the load 116. Storage modules 120a, 120b, 120c constructed according to the present invention are connected across conductor 111a and the neutral conductor 113, conductor 111b and the neutral conductor 113, and conductor 111c and the neutral conductor 113, respectively. Each of the storage modules 120a, 120b, 120c comprise a capacitor 124a, 124b, 124c, and an inductor 122a, 122b, 122c connected in parallel. As previously described, the storage modules 120a, 120b, 120c are tuned to the system line frequency and are sized so as to supply the integrating current required to reduce the effects of harmonics as seen by the load 116. Inductors 121a, 121b, and 121c may be advantageously placed in series between the power source 112 and the storage modules 120a, 120b, 120c to isolate the power system from the effect of harmonic distortion and to increase the impedance of the power source 112 as seen by the load 116 so as to enable more efficient use of the storage modules 120a, 120b and 120c. Additionally, as shown in FIG. 9, series capacitors 419a, 419b and 419c, which, together with series inductors 121a, 121b, and 121c are tuned to the system line frequency, may be positioned in series with the series inductors 121a, 121b, 121c. Additional windings 423a, 423b, 423c connected to the inductors 422a, 422b, 422c, respectively, may be added to storage modules 420a, 420b, 420c and connected in series with series inductors 121a, 121b, and 121c, respectively, to boost the output voltage.

Figure 7:
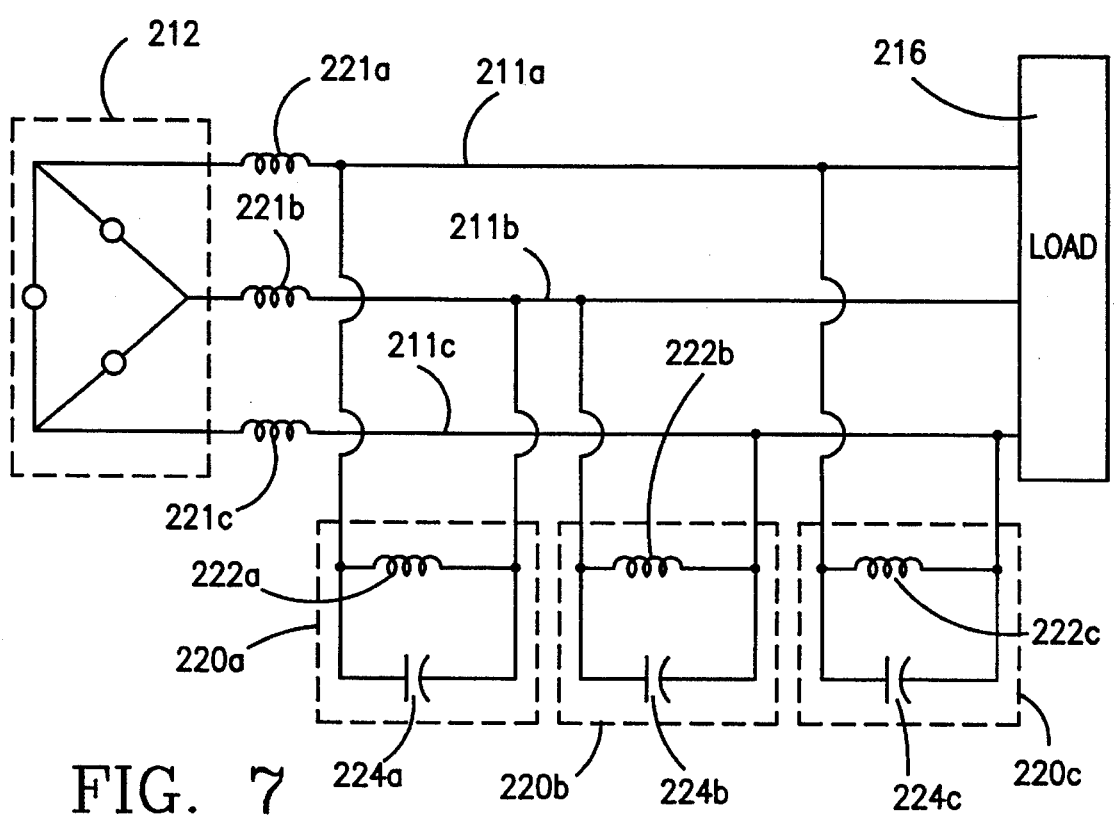
FIG. 7 is a schematic diagram of another embodiment of the alternating current storage module connected in a 3-phase delta-configuration power system.
Figure 10:
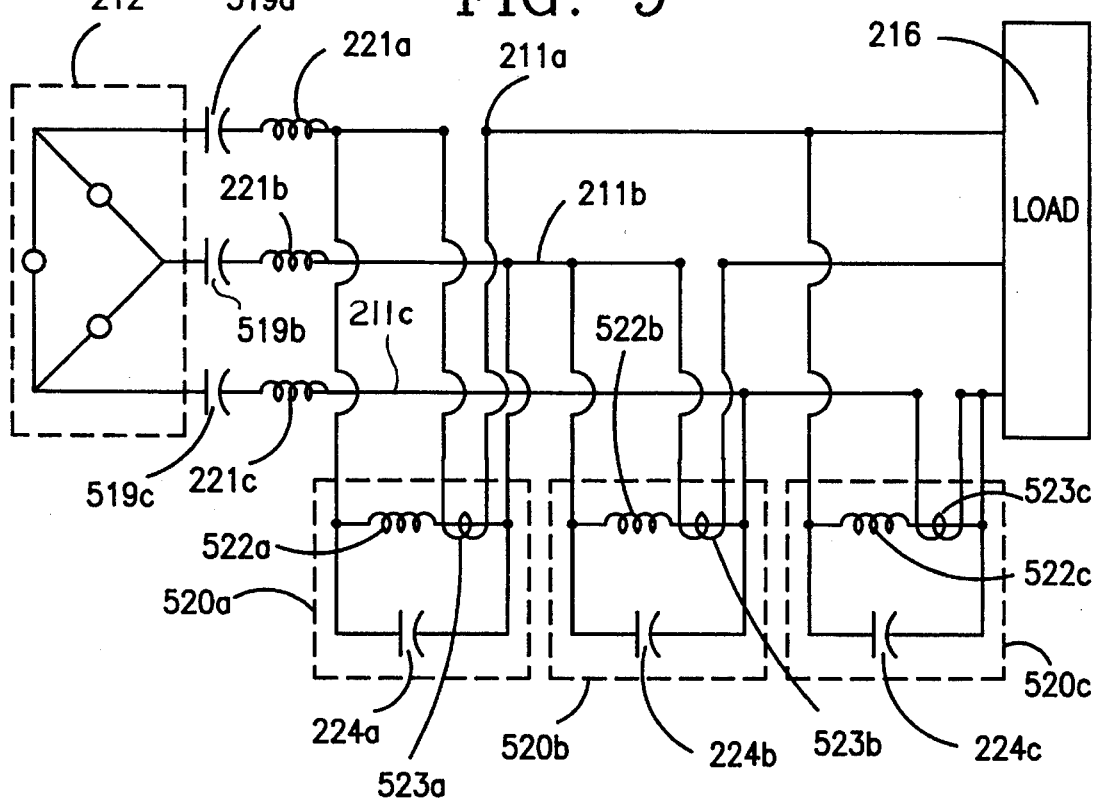
FIG. 10 is a schematic diagram of another embodiment of the circuit of FIG. 8 as adapted for a 3-phase delta-configuration power system.

According to another embodiment of the invention and with reference to FIG. 7, a three-phase power source 212 in the delta configuration is shown. Three identical storage modules 220a, 220b, 220c, each comprising an inductor 222a, 222b, 222c and a capacitor 224a, 224b, 224c connected in parallel are constructed. The storage modules 220a, 220b, 220c are tuned to the system line frequency and are connected between conductor 211a and conductor 211b, conductor 211b and conductor 211c, and conductor 211a and conductor 211c, respectively, and in parallel with the load 216. Inductors 221a, 221b, 221c may be advantageously placed in series between the power source 212 and the storage modules 220a, 220b, 220c along conductors 211a, 211b, 211c, respectively. With reference to FIG. 10, capacitors 519a, 519b, and 519c, may be placed in series with inductors 221a, 221b, and 221c, respectively, such that the inductors 221a, 221b, 221c and capacitors 219a, 219b, and 219c, are tuned to the system line frequency. Additional windings 523a, 523b, 523c, connected to the inductors 522a, 522b, 522c, respectively, may be added to storage modules 520a, 520b, 520c and connected in series with series inductors 221a, 221b, and 221c, respectively, to boost the output voltage.

It will be understood that a variety of additional components may be added to tailor the storage module 20 of the present invention to specific applications. By way of example only and not intended to be limited thereby, some of such features may include common mode and noise canceling filters and spike arresting devices to limit voltage deviations at the sensitive load. The storage module 20 may be electrically scaled to provide a product directed primarily to the smaller applications, for example, a personal computer as well as larger facility-wide storage applications.

Larger storage module 20 devices may be constructed in single or multiple segments as needed to provide the best compromise for layout and implementation. Multiple storage modules 20 may be added to the power system line 11 without concern for interaction between similar or different sized units as each storage module 20 remains electrically isolated from the others. In installations where the loading characteristics may be dynamic or applications change frequently, storage modules 20 that are significantly larger than sometimes needed may be installed. Any extra capacity will not cause degradation of the operation of the power system and will serve to improve the waveform shape by reducing harmonic distortion. Unlike typical noise filter devices, the storage module 20 components are mutually nulling and do not appear as lumped constants that could affect power system stability. That permits the storage module 20 devices to be added to an existing installation without an extensive analysis of the power distribution system.

As such, the storage module 20 of the present invention when connected across a load 16 provides a cost-effective and operationally effective solution to the problems caused by harmonic distortion or nonlinear loading on a power signal. The storage module 20 corrects harmonic voltage and current distortion, eliminates voltage transients including low level spikes (plus or minus), while being immune to common control circuit limitations (roll off frequencies). The resonant circuit of the storage module 20 mutually nulls the effects of both the inductive and capacitive reactances and does not disturb distribution systems. As such, the storage module 20 provides energy to fill in short term line voltage dropouts or dips, thereby improving the waveform of the power distribution system to which it is attached. By installing the storage module 20 in parallel with the power line, no fault or surge current needs to be passed through the storage module 20. The storage module 20 may be any size electrically and may be scaled to different line frequencies. Idling power consumption is very low and efficiency is high as no power is transformed for storage, that is, no conversion of energy is needed. The capacity may be increased by adding numerous smaller storage modules 20 in parallel without interaction amongst the storage modules 20. Finally, the storage module may be configured for single or three-phase power systems as required.

It will be understood that variations and changes in the details of the present invention as herein described and illustrated may be made by those skilled in the art without departing from the spirit, principle, and scope of the present invention. Accordingly, it is expressly intended that all such equivalents, variations, and changes therefrom which fall within the principle and scope of the present invention as described herein and defined in the claims be embraced thereby.

What is claimed is:

1. A circuit for correcting perturbations in a power system signal operating at a system line frequency, said circuit comprising:

capacitive means for drawing a capacitive current;

first inductive means for drawing an inductive current substantially equal in amplitude and substantially one hundred eighty degrees out of phase with said capacitive means to form a storage module for storing energy therein and wherein said storage module is tuned to resonate at said system line frequency, wherein said storage module is connected in parallel across a load and wherein said storage module has circulating currents similar in amplitude to said load;

a second inductive means connected in series between a power source and said load for isolating said power source from said load;

a second capacitive means connected in series with said second inductive means, wherein said second inductive means and said second capacitive means are series tuned to resonate at said system line frequency; and a winding means having two output terminals, said winding means connected so as to be responsive to said inductive current flowing through said first inductive means for boosting an output voltage of said storage module, said output terminals being connected in series with said second inductive means.

2. A circuit for correcting perturbations in a power system signal operating at a system line frequency, said circuit comprising:

capacitive means for drawing a capacitive current;

first inductive means for drawing an inductive current substantially equal in amplitude and substantially one hundred eighty degrees out of phase with said capacitive current, said first inductive means connected in parallel with said capacitive means to form a storage module for storing energy therein and wherein said storage module is tuned to resonate at said system line frequency, wherein said storage module is connected in parallel across a load and wherein said storage module has circulating currents similar in amplitude to said load; and winding means having two output terminals, said winding means being responsive to said inductive current flowing through said first inductive means to boost an output voltage available to said load, wherein said output terminals are connected in series between a power source and said load.

* * * * *